United States Patent [19]

Blum et al.

[11] Patent Number: 5,639,844

[45] Date of Patent: Jun. 17, 1997

[54] DEHYDROCOUPLING TREATMENT AND HYDROSILYLATION OF SILICON-CONTAINING POLYMERS, AND COMPOUNDS AND ARTICLES PRODUCED THEREBY

[75] Inventors: Yigal Blum, San Jose; Gregory A. McDermott, San Francisco, both of Calif.

[73] Assignee: SRI International, Menlo Park, Calif.

[21] Appl. No.: 548,082

[22] Filed: Oct. 25, 1995

Related U.S. Application Data

[62] Division of Ser. No. 63,617, May 18, 1993.

[51] Int. Cl.$^6$ .................................................... C08G 77/08
[52] U.S. Cl. ............................... 528/15; 528/17; 528/19; 528/28; 528/29; 528/31; 528/12; 528/13; 528/16; 528/21; 528/23; 521/154
[58] Field of Search ........................ 528/15, 17, 19, 528/28, 29, 31, 12, 23, 21, 16, 13; 521/154

[56] References Cited

U.S. PATENT DOCUMENTS

| | | | |
|---|---|---|---|
| 3,328,448 | 6/1967 | Barnes, Jr. et al. ...................... | 528/15 |
| 4,026,835 | 5/1977 | Lee et al. ................................ | 521/154 |
| 4,026,843 | 5/1977 | Kittle et al. ............................. | 521/154 |
| 4,612,383 | 9/1986 | Laine et al. . | |
| 4,788,309 | 11/1988 | Laine et al. . | |
| 4,952,715 | 8/1990 | Blum et al. . | |
| 5,008,422 | 4/1991 | Blum et al. . | |
| 5,055,431 | 10/1991 | Blum et al. . | |
| 5,128,494 | 7/1992 | Blum et al. . | |
| 5,246,738 | 9/1993 | Blum . | |
| 5,319,121 | 6/1994 | Blum . | |
| 5,405,655 | 4/1995 | Blum et al. .............................. | 528/28 |

FOREIGN PATENT DOCUMENTS

| | | |
|---|---|---|
| 0304239 | 2/1989 | European Pat. Off. . |

OTHER PUBLICATIONS

J.P. Collman et al., "*Principles and Applications of Organotransition Metal Chemistry*", Univ. Science Bks, pp. 384–392 (1980).

L.H. Sommer et al., "*Group VIII Metal Catalyzed Reactions of Organosilicon Hydrides with Amines, Hydrogen Halides, and Hydrogen Sulfide*", J. Org. Chem. 32:2470–2473 (1967).

J.L. Speir et al., "*The Addition of Silicon Hydrides to Olefinic Double Bonds. Part II. The Use of Group VIII Metal Catalysts*", J. Am. Chem. Soc. 79:974–978 (1957).

Primary Examiner—Melvyn I. Marquis
Attorney, Agent, or Firm—Reed & Robins

[57] ABSTRACT

Novel methods for the preparation of polymers useful as precursors to ceramic materials by catalytic activation of Si—H bonds are disclosed. The methods comprise reacting, in the presence of a catalyst effective to activate Si—H bonds, Si—N bonds, or both, and/or a reactive solvent, a polymer in the form of a polysilane, polysilazane, polysiloxane or polycarbosilane with a reactant having the structural formula R—X—H, wherein X is NR' or O, R is H, organic, silyl, siloxyl, silazanyl or carbosilyl and may contain at least one additional X—H group, and R' is H, amino, silyl or silazanyl, to produce a modified polymer containing at least one Si—X bond. Polymers produced by these methods are also disclosed.

20 Claims, 2 Drawing Sheets

DEHYDROCOUPLING TREATMENT AND HYDROSILYLATION OF SILICON-CONTAINING POLYMERS, AND COMPOUNDS AND ARTICLES PRODUCED THEREBY

This application is a divisional of U.S. patent application Ser. No. 08/063,617, filed May 18, 1993.

TECHNICAL FIELD

This invention relates generally to chemical reactions involving dehydrocoupling and hydrosilylation, and more particularly relates to dehydrocoupling treatment and hydrosilylation of silicon-containing polymers. The invention additionally relates to methods of enabling fast cure of preceramic silicon-containing polymers, dehydrocoupling and hydrosilylation in reactive solvents, methods for increasing the nitrogen content of silicon-containing materials, and techniques for increasing the ceramic yield obtained upon pyrolysis of silicon-containing materials. The invention also relates to methods of functionalizing silicon-containing polymers, i.e., techniques for incorporating functional groups such as $NH_2$, OH, COOH, and the like. The invention also encompasses materials and articles produced by the presently disclosed methods.

BACKGROUND

The invention relates primarily to the preparation of polymers that are useful as precursors to ceramic materials, i.e., which serve as "preceramic" polymers, by catalytic activation of Si—H bonds, or as high temperature resins. Preceramic polymers are polymers which may be converted upon pyrolysis to ceramic products. The present invention provides preceramic silane, silazane, siloxane and carbosilane polymers which are useful for preparing a wide variety of silicious ceramic materials and articles, e.g., fibers, films, shaped products and the like, comprising materials such as silica, silicon oxynitride or silicon carbide.

In general, preceramic silicon-containing polymers, or "ceramic precursors," may be prepared by catalytic activation of Si—H bonds, and/or Si—N bonds, as disclosed in commonly assigned U.S. Pat. Nos. 4,788,309, issued Nov. 29, 1988, to Laine et al., 5,055,431, issued Oct. 8, 1991, to Blum et al., and 5,128,494, issued Jul. 7, 1992 to Blum, the disclosures of which are hereby incorporated in their entirety by reference. Briefly, silicon-containing starting materials containing Si—H bonds, and/or Si—N bonds, are reacted with a compound of the general formula R—X—H, wherein X is typically O or NH, and wherein R is H, alkyl or aryl, a moiety containing an unsaturated carbon-carbon bond, an amine or an organic or hydroxy metal compound.

Previously, catalytic activation of Si—H bonds was primarily used for hydrosilylation of unsaturated compounds, as illustrated by reaction (1):

$$R_3Si-H + R_2C=X \xrightarrow{M} R_2CH-XSiR_3 \quad (1)$$
$$(X = O, CR_2)$$

Numerous homogeneous and heterogeneous catalysts have been used to promote such reactions. See, e.g., J. L. Speier et al. (1957) J. Am. Chem. Soc. 79: 974. Typical application of these reactions has been in organic synthesis or in the crosslinking of silicon rubbers (J. P. Collman et al. in "Principles and Applications of Organotransition Metal Chemistry", pp. 384–392. University Science Books, 1980). Such reactions have been used in crosslinking of preceramic polymers, as described in commonly assigned U.S. Pat. No. 5,008,422, issued Apr. 16, 1991, to Blum et al., the disclosure of which is hereby incorporated in its entirety by reference.

Related reactions involving substitution at an Si—H bond have been used to form compounds containing Si—X groups wherein X is, for example, halogen, alkoxy, or substituted or unsubstituted amino:

$$R_3Si-H + H-X \xrightarrow{catalyst} R_3Si-X + H_2$$

L. H. Sommer et al. (1967) J. Org. Chem. 32:4270. Only mono- and di-substituted aminosilanes, halosilanes and alkoxysilanes have been synthesized by this method.

To date, many conventional methods of preparing ceramic precursors, and the precursors prepared thereby, suffer myriad problems including low ceramic yields and slow cure rates. High ceramic yields are of considerable value in binder applications, fabrication of injection molded parts and in matrix applications. During pyrolysis the density/volume change from preceramic polymer (1–1.3 g/cc) to amorphous ceramic (about 2.0 g/cc) can be significant. Thus, ceramic yields far below theoretical will only magnify the resulting density/volume change. For example, a 50% ceramic yield for a $Si_3N_4$ precursor of density 1.0 will result in a final decrease in volume of approximately 80%. In general, preceramic polymers known in the art provide relatively low ceramic yields upon pyrolysis.

Synthesis of preceramic polymers generally includes a curing interval during which a preceramic composition must "set" before being amenable to pyrolysis to a ceramic material. This curing period can be slow, incorporate undesired elements such as excess oxygen and can significantly reduce the efficiency of the polymer processing method.

In addition, products of known synthetic methods are often undesirably contaminated with oxygen, are not readily machinable or otherwise workable and either cure too fast or too slowly. These disadvantages preclude the desired control of the preceramic polymer molecular weight, structural composition and viscoelastic properties which to a large extent determine the tractability of the polymer, the ceramic yield, and the capability for specific ceramic processing.

In addition to addressing the above-described disadvantages of the prior art, the present invention is directed to a new approach to polymer processing and involves preparation of preceramic polymers useful in Baking ceramic materials and reaction of polysilanes, polysiloxanes, polysilazanes and polycarbosilanes by catalytic activation of Si—H bonds contained therein. Preceramic polymers produced using the present method are highly "processable" and, upon pyrolysis, give the desired ceramic material in relatively high yield. The ceramic yield upon pyrolysis of ceramic precursor polymers produced as herein described is increased over that of previous polymers.

The invention also provides a unique and novel method of functionalizing silicon-containing preceramic polymers before, during or after curing. Previously, in order to obtain a preceramic polymer with specific functionalities, precursor monomers with the desired functional moieties were required as reactants in the polymerization process. The present invention represents a significant advance in the art by enabling functionalization of a basic preceramic polymer as desired, whether cured or not, rather than requiring de novo synthesis of a preceramic polymer possessing appropriate functional moieties. The invention provides an approach to preparing polymers containing functional groups such as $NH_2$, OH, COOH or the like, that are also curable.

Advantages of the present invention include, but are not limited to, the following: the ability to modify preceramic precursors' rheological and pyrolytic properties; the ability to cure meltable preceramic polymers after fabrication without the need for conventional oxygen curing (oxygen curing produces oxides, thereby limiting ceramic fiber performance to about 1100° C.); an increase in ceramic yield; and the ability to incorporate nitrogen in final ceramic products, thereby enhancing product performance.

Although the products of the method disclosed and claimed herein are referred to as preceramic polymers, the present invention can provide useful polymeric materials which are other than ceramic materials, i.e., polymeric materials which are useful without further conversion to a ceramic material.

SUMMARY OF THE INVENTION

It is thus a primary object of the present invention to overcome the above-mentioned disadvantages of the prior art.

It is another object of the invention to provide methods of modifying silicon-containing polymers via a dehydrocoupling reaction combined or uncombined with a hydrosilylation reaction.

Another object of the invention is to provide methods for increasing the nitrogen content of silicon-containing polymers.

It is a further object of the present invention to provide a method of modifying a silicon-containing polymer by reacting the polymer with a reactant and/or a reactive solvent in the presence or absence of a catalyst.

Another object of the invention is to provide a method of reacting a polymer with a curing agent in a solvent wherein a curing agent is added to the solution.

Another object of the invention is to provide a method of reacting a polymer with a curing agent in a solvent wherein a curing agent is introduced as a gas.

An additional object of the invention is to provide a method enabling fast cure of preceramic silicon-containing polymers.

A further object of the invention is to provide a method of functionalizing silicon-containing polymers.

It is an additional object of the invention is to provide polymers produced by the methods disclosed herein.

Additional objects, advantages and novel features of the invention will be set forth in part in the description which follows, and in part will become apparent to those skilled in the art on examination of the following, or may be learned by practice of the invention.

In one aspect of the invention, a method is provided in which a reaction is caused to occur between a polymer in the form of a polysilane, polysilazane, polysiloxane or polycarbosilane, with a reactant having the structural formula R—X—H, wherein X is NR' or O, R is H, organic, for example, hydrocarbyl, halocarbyl, ether-containing hydrocarbyl, acyl, and the like, silyl, siloxyl, silazanyl or carbosilyl, and may contain at least one additional X—H group, and R' is H, organic as above, amino, silyl or silazanyl, in the presence of a transition metal catalyst, or an acid or base catalyst effective to activate Si—H bonds, X—H bonds, or both, such that a modified polymer is produced containing at least one Si—X bond and H$_2$ is released.

In another aspect of the invention a method is provided for modifying a polymer via a dehydrocoupling reaction, wherein a polymer having the structural formula in which X is O, NR' or organic, for example hydrocarbyl, halocarbyl, ether-containing hydrocarbyl, acyl, or the like, or alternatively absent, i.e., representing a covalent single bond, wherein R' is H, amino, silazyl, or silazanyl and R is H, organic, siloxyl, silazanyl or carbosilyl and may contain X—H groups, is reacted with R—X'—H, wherein X' is defined as for X, in the presence of a transition metal catalyst to produce a modified polymer having at least one Si—X bond, and H$_2$ is released.

In a further aspect of the invention, a method is provided for modifying a polymer containing at least one Si—H group via a dehydrocoupling reaction comprising providing a polymer in the form of a polysilane, polysilazane, polysiloxane or polycarbosilane, providing a reactive solvent having the structural formula R'(OH)$_n$ where R' is organic and n is 1 or 2, or R—NH$_2$ wherein R is organic, siloxyl, silazanyl or carbosilyl, and causing a reaction to occur between the polymer and the reactive solvent, in the absence of a catalyst, such that at least one Si—H bond in the polymer is replaced with an Si—N linkage, and H$_2$ is released.

DETAILED DESCRIPTION OF THE INVENTION

Before the present methods and polymers are disclosed and described, it is to be understood that this invention is not limited to specific reaction conditions or polymers, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a catalyst" includes mixtures of catalysts, reference to "a reactive solvent" includes mixtures of such solvents, and the like.

In this specification and in the claims which follow, reference will be made to a number of terms which shall be defined to have the following meanings:

The term "polymer" is intended to include both oligomeric and polymeric species, i.e., compounds which include two or more monomeric or cyclomeric silane, silazane, siloxane, siloxazane or carbosilane units.

"Silanes" as used herein are compounds which contain one or more silicon-silicon bonds. The term "silanyl" refers to the silane radical. The term "polysilane" is intended to include oligomeric and polymeric silanes, i.e., compounds which include two or more monomeric silane units.

"Silazanes" as used herein are compounds which contain one or more silicon-nitrogen bonds. The term "silazyl" refers to a silazane radical. The term "polysilazane" is intended to include oligomeric and polymeric silazanes, i.e., compounds which include two or more monomeric silazane units.

"Siloxanes" as used herein are compounds which contain one or more silicon-oxygen bonds and may or may not contain cyclic units. The term "siloxyl" refers to a siloxane radical. The terms "polysiloxane" and "siloxane polymer" as used herein are intended to include oligomeric and polymeric siloxanes, i.e., compounds which include two or more monomeric siloxane units.

"Siloxazanes" as used herein are compounds which contain the unit [O—Si—N]. The term "silazanyl" refers to a siloxazane radical. The term "polysiloxazane" is intended to include oligomeric and polymeric siloxazanes, i.e., compounds which include two or more monomeric siloxazane units.

"Carbosilanes" as used herein are compounds which contain one or more silicon-carbon bonds in the backbone and may or may not contain cyclic units. The term "carbosilyl" refers to a carbosilane radical. The terms "polycarbosilane" and "carbosilane polymer" as used herein are intended to include oligomeric and polymeric carbosilanes, i.e., compounds which include two or more monomeric carbosilane units.

The term "silyl" unless otherwise specified, includes silazyl, siloxyl, silazanyl and carbosilyl.

The term "dehydrocoupling reaction" unless otherwise specified, is intended to include dehydrocoupling reactions and, in addition, either simultaneously or sequentially occurring dehydrocoupling and hydrosilylation reactions.

The term "organic" as used herein refers to a branched, unbranched or cyclic hydrocarbon group of 1 to 26 carbon atoms, typically of 1 to 8 carbon atoms. "Organic" groups include, inter alia, alkyl, alkenyl, alkylene and aryl groups.

A "lower alkyl" or "lower alkoxy" group is an alkyl or alkoxy group, respectively, having 1–6 carbon atoms, more typically 1–4 carbon atoms, therein.

The term "pyrolysis" as used herein refers to the conversion of an organometallic material to an inorganic material by either removing the organic components as volatile materials or converting them into inorganic carbon-containing species.

A "tractable" polymer is one which is meltable, soluble or malleable or which can be processed like an organic polymer to form a desired shape.

A "preceramic" polymer is one which is capable of being pyrolytically converted to an inorganic material. However, reference to a polymer as "preceramic" is not intended to limit the utility of the polymers in any way, as polymers identified herein as "preceramic" may have a variety of uses, some of which do not involve pyrolytic conversion to ceramic materials.

The "ceramic yield" of a compound upon pyrolysis indicates the ratio of the weight of the ceramic product after pyrolysis to the weight of the compound before pyrolysis.

In the present reaction scheme, a polymer precursor is initially provided which contains at least two Si—H groups.

The polymer precursor may be a polysilane, a polysiloxane, a polysilazane, a polycarbosilane or the like. The polymer precursor is preferably reacted in the presence of a catalyst, with or without a solvent, with a compound of the general formula R—X—H, where X is NR' or O, R is H, organic (containing saturated or unsaturated moieties), haloorganic, siloxyl, silazanyl or carbosilyl, and may contain additional X—H groups, and R' is H, amino, silazyl or silazanyl. By this method, polymers having Si—X bonds—although still containing at least one Si—H bond—are produced, with the simultaneous release of $H_2$.

The silicon-containing starting material may be a monomer, oligomer or polymer. Monomeric starting materials may be polymerized prior to, during, or after curing. If the two steps are carried out sequentially, it is preferred that the same reaction conditions and reaction vessel be used. In addition, polymeric starting materials may be functionalized, then cured further.

Silicon-containing polymer starting materials having the general formula $$\left[ \begin{array}{c} R \\ | \\ -Si-X-Si-X- \\ | \\ R \end{array} \begin{array}{c} R \\ | \\ \\ | \\ R \end{array} \right]_x$$

are selected from the following groups of preferred polymers.

The first group of starting materials comprises polysilanes which contain structural units —[$R_2Si$—$SiR_2$]—, wherein R is independently selected from the group consisting of H, lower alkyl, lower alkoxy, which may be either saturated or unsaturated, and which may be either unsubstituted or substituted with hydroxyl, lower alkyl, lower alkoxy, halogeno, silyl, or $NR''_2$ groups, wherein R" is H or lower alkyl, and aryl of 1–2 rings, which may be similarly substituted. Preferably, R is lower alkyl. Exemplary polysilanes within this group are of the general formula One such specifically preferred polymer is where R is $CH_3$.

A second group of starting materials comprises polysiloxanes which contain structural units —[RSiH—O]—, wherein R is as above. One such specifically preferred polymer is where R is $CH_3$.

A third group of polymer starting materials comprises polysilazanes which contain structural units —[$R_2Si$—NR]—.

A fourth group of polymer starting materials comprises polycarbosilanes which contains structural units —[$R_2Si$—X]—, wherein X is organic, for example, hydrocarbyl, halocarbyl, ether-containing hydrocarbyl, acyl, or the like, and R is as above. Preferably, X is alkylene, and more preferably X is —$CH_2$—. Exemplary polycarbosilanes within this group are of the general formula wherein n is 1, 2 or 3. In all of the above, x indicates the number of recurring mer units in the polymer.

The starting materials will frequently be commercially available, or may be synthesized according to the methods of commonly assigned U.S. Pat. Nos. 4,788,309, issued Nov. 29, 1988, to Laine et al., or 5,055,431, issued Oct. 8, 1991, to Blum et al., cited above.

Particularly preferred polymers for use in conjunction with the present invention are those which are described in detail in applicants' commonly assigned U.S. Pat. Nos., as follows: 4,952,715 to Blum et al., issued 28 Aug. 1990 ("Polysilazanes and Related Compositions, Processes and Uses"), 5,008,422 to Blum et al., issued 16 Apr. 1991 (also entitled "Polysilazanes and Related Compositions, Processes and Uses").

Preceramic polymers which may be obtained by the aforementioned process may be exemplified by the products of the following Schemes I-IV.

Scheme I

Scheme II

Scheme III

Scheme IV

Scheme VI

In the above Schemes I through IV, Z is O, N, linear or cyclomeric organic, for example, hydrocarbyl, halocarbyl, ether-containing hydrocarbyl, acyl or the like, or linear or cyclomeric silyl, siloxyl or silazanyl. Alternatively, Z may be absent, i.e., representing a covalent single bond. R is as defined above.

In order to obtain the polymer desired, it is preferred that the polymer be reacted in the presence of a catalyst with a material of the general formula R—X—H, wherein R and X are as defined above. An organic compound containing unsaturated bonds, such as an olefin, acetylene or a ketone, may be added before, during or after the reaction of the polymer with R—X—H to provide further modification. These reactions may also be carried out after polymer fabrication.

In the absence of a reactive solvent, and often even in the presence of a reactive solvent, it is required that the aforementioned reactions be carried out in the presence of a catalyst. Catalysts suitable for carrying out these reactions include any type of transition metal catalysts such as those indicated in Tables I and II below. Table I sets forth homogeneous catalysts which dissolve in the reactants. Heterogenous catalysts such as those of Table II may also be used, as can mixtures of homogeneous catalysts and/or heterogeneous catalysts. (It should be pointed out here that the "homogeneous" and "heterogeneous" classifications are made herein on the basis of solubility in organic solvents. However, it is not uncommon that during the reactions, homogeneous catalysts may be converted into heterogeneous form and vice versa.) These catalysts may include any number of ligands, including amino, silyl, halogen, carbonyl, hydrido, phosphine, and organic ligands, as discussed below and as illustrated in Tables I and II. Preferably, the transition metal catalyst is a ruthenium catalyst, most preferably ruthenium dodecacarbonyl. Acidic and basic catalysts may also be used. Typically, for reactions with R—X—H where X is O, suitable catalysts include acid catalysts such as HCl, $H_2SO_4$, HBr, $NH_4Cl$, $NH_4Br$, $AlCl_3$, $BCl_3$ and $H_3PO_4$, and basic catalysts such as NaOH, KOH, $Ca(OH)_2$, $NH_3$ and pyridine.

The catalyst(s) may be supported on a substrate comprising a polymeric material, an inorganic salt, carbon, a ceramic material or the like. The heterogenous catalyst may be provided in a designed shape, such as particles, porous plates, etc.

The catalyst can be activated by heating alone or by concurrent treatment of the reaction medium with particulate or nonparticulate radiation. The catalyst may also be activated by promoters such as acids, bases, oxidants or hydrogen, or may be stabilized by reagents such as amines, phosphines, arsines and carbonyl. The concentration of catalyst will usually be less than or equal to about 5 mole % based on the total number of moles or reactants, usually between about 0.1 and 5 mole %. In some instances, however, catalyst concentration will be much lower, on the order of 20 to 200 ppm.

TABLE I. HOMOGENEOUS CATALYSTS $H_4Ru_4(CO)_{12}$, $Ru_3(CO)_{12}$, $Fe_3(CO)_{12}$, $Rh_6(CO)_{16}$, $Co_2(CO)_8$, $(Ph_3P)_2Rh(CO)H$, $H_2PtCl_6$, nickel cyclooctadiene, $Os_3(CO)_{12}$, $Ir_4(CO)_{12}$, $(Ph_3P)_2Ir(CO)H$, $Pd(OAc)_2$, $Cp_2TiCl_2$, $(Ph_3P)_3RhCl$, $H_2Os_3(CO)_{10}$, $Pd(Ph_3P)_4$, $Fe_3(CO)_{12}/Ru_3(CO)_{12}$ mixtures, also mixtures of metal hydrides.

TABLE II. HETEROGENEOUS CATALYSTS

Pt/C, $Pt/BaSO_4$, Cr, Pd/C, Co/C, Pt black, Co black, Pd black, $Ir/Al_2O_3$, $Pt/SiO_2$, $Rh/TiO_2$, $Rh/La_3O_3$, Pd/Ag alloy, $LaNi_5$, $PtO_2$.

Mild temperatures that will activate the catalyst are typically used. Such temperatures will normally be in the range of −78° C. to 250° C. Higher temperatures are necessary especially where steric hindrance is a problem.

An important advantage of the methods of the present invention is the increased reaction rates obtained relative to analogous prior art methods. Increasing the cure rate promotes rapid conversion of the starting materials containing Si—H bonds to products containing Si—X bonds with a resultant greater viscosity. Initially, the conversion to a low viscosity product which can be molded, fabricated, infiltrated, etc., is relatively slow, taking on the order of 18 hr to 36 hr, depending on the reaction conditions. This initial slow increase in viscosity and consequent crosslinking is followed by a rapid increase in viscosity, after which the product may be manufactured or otherwise worked. In the presence of a reactive solvent, the initial, relatively slow cure step can be enhanced by as much as two orders of magnitude.

If desired, the polymer may be cured before, during or after modification, by reaction with a curing agent. The curing agent may be any chemical reagent which is capable of bridging two silicon-containing polymer units. The curing agent typically has the formula H—Z—H, wherein Z is oxygen, sulfur, phosphoro, amino (unsubstituted or substituted with one or more lower alkyl or silyl groups), —O—Y—O—, —NX—NX—, or —NX—Y—NX—, where Y is a linking group, typically lower alkyl or silyl, and X is typically lower alkyl, silyl, or hydrogen. Such a reaction provides —Z— bridges between silicon atoms of two polymer units (which may be oligomeric, polymeric or cyclomeric), either extending the degree of polymerization of or crosslinking the product.

Alternatively, a monomeric, polymeric, oligomeric or cyclomeric silicon-containing starting material may be directly treated with an agent H—Z—H in a dehydrocoupling reaction to give a coupled or polymerized product.

The reaction is carried out in solution with the solvent comprising either the reactants themselves, i.e., no additional solvent is added, or an added nonreactive solvent, such as a hydrocarbon, an ether (e.g., ethyl ether, tetrahydrofuran), a halogenated hydrocarbon ($CHCl_3$, $CH_2Cl_2$, $ClCHF_2$, $ClCH_2CH_2Cl$), an aromatic such as benzene, toluene, or methylphenyl ether, or a polar solvent such as acetonitrile, pyridine, or a tertiary amine, or a reactive solvent, as described above, or mixtures thereof.

Optionally, in the absence of a catalyst, a reactive solvent such as a strong base, an amine, a diamine, a monohydric alcohol or a diol may be used to activate polymerization. Typically such solvents contain fewer than about six, preferably fewer than about four, carbon atoms, e.g., monomethylamine, monoethylamine, diethylamine, methanol, ethanol and the like. In such case, activation of either Si—H or Si—X bonds can occur, thereby causing polymerization and crosslinking.

The polymers prepared by the methods disclosed and claimed herein may be used to form fibers, films, three-dimensional articles and the like. The materials may also be useful as coatings for many different substrates.

It may be desirable to incorporate organic or inorganic powders into a coating solution. This may be done for a number of reasons, the most obvious of which is to increase the viscosity of the coating solution to enable preparation of a paste or of a relatively thick solution which may be "painted" onto a substrate. For example, metal powders, such as copper, iron, zirconium, titanium, tungsten, molybdenum and aluminum powders may be admixed with the polymeric solution prior to coating. Such a technique is useful, for example, to provide an anti-corrosion barrier on the surface of a metallic substrate. Incorporation of metal powder into the coating solution is also useful to prepare a harder coating, regardless of substrate (in which case preferred metal powders include zirconium, titanium, tungsten, molybdenum and hafnium powders). It may additionally be desired to incorporate ceramic and glass powders such as silicon carbide, silicon nitride, boron carbide, titanium carbide, titanium nitride, tungsten carbide, molybdenum oxide, and aluminum oxide, typically for the purpose of creating a harder coating, but also for providing a nonconductive surface on a conductive substrate, for providing corrosion-resistant coatings, impact-resistant coatings, and coatings having a mismatched thermal expansion coefficient, i.e., relative to the substrate surface. Inclusion of silica, boron nitride, aluminum nitride or beryllium oxide powders in the coating solution is desirable in electronics application, insofar as these materials are good dielectrics. Carbon powder (including pyrolytic carbon powder and graphite powder) and organic powders such as teflon, siloxane (cured), polycarbonate, or polyimide powders may also be used to thicken the coating solution. Corrosion inhibitors, dyes, pigments, and electrically, magnetically or optically active materials can also be incorporated as powders with the polymers into the coating solution.

Although powders find their primary utility in coating solutions, they may also be used in any composition or solution containing preceramic polymers, i.e., powders may be incorporated into any of the final products incorporating preceramic polymers.

Another important advantage of the methods and compositions of the present invention is the specificity and degree of ceramic yield upon pyrolysis. Generally, an increase in the oxygen content of the ceramic precursor will result in a higher oxygen content in the ceramic product, while an increase in the carbon content of the precursor will result in a higher carbon content in the ceramic product. High molecular weight polysilazanes display a correspondingly high ceramic yield, the ceramic materials so provided having a high silicon nitride content, if desired. Silicon nitride may be provided with purity higher than about 80% upon pyrolysis of the polysilazanes provided herein when pyrolysis is conducted under nitrogen, argon or other inert atmosphere, or higher than about 95% upon pyrolysis of the polysilazanes in an ammonia or other amine atmosphere. Carbon-free polysilazanes which may be prepared according to the method herein may provide silicon nitride of even higher purity, i.e., 98–99% or higher.

Similarly, high ceramic yields of silicon oxynitride ($Si_2ON_2$) mixtures may be obtained upon pyrolysis using the methods described herein. The novel methods represent a significant advance in the art, as known synthetic procedures for making silicon oxynitride, a desirable ceramic material having refractory properties of both oxides and nitrides, are problematic.

In addition to the chemical composition of the ceramic precursor, the atmosphere in which pyrolysis is conducted (as well as the pyrolysis temperature) also dictates the composition of the ceramic product. Ceramic materials which may be obtained by the present method include, inter alia, silica, silicon carbide, silicon oxycarbide, silicon nitride, silicon oxynitride, and mixtures thereof.

Silica will be provided by pyrolysis of a ceramic precursor containing Si in oxygen or in an oxygen-containing atmosphere. For example, carbon-free polysiloxanes which may be prepared according to the method disclosed herein will provide silica of very high purity, i.e., 98–99% or higher.

The ceramic precursors prepared according to the methods described herein may also be pyrolyzed to give silicon nitride, silicon oxynitride and silicon carbide, resulting in higher ceramic yields that previously possible.

Procedurally, pyrolysis is preferably carried out as follows. A ceramic precursor prepared as described above is heated in the selected atmosphere at a predetermined heating rate. If it is desired that the composition of the pyrolysis product correspond substantially to the composition of the precursor, pyrolysis should be carried out in an inert atmosphere. If desired, pyrolysis may be carried out in a reactive atmosphere, e.g., under $O_2$, $NH_3$, $H_2O_2$, $H_2O$, $N_2O$, $H_2$, an alkylamine or the like. Pyrolysis in a reactive amine atmosphere (i.e., under ammonia or an alkylamine gas) will typically give more nitrogen in the ceramic product, e.g., in the form of silicon nitride or silicon oxynitride.

Preferred heating rates for bulk pyrolysis are in the range of about 0.1° C. to about 20° C. per minute, preferably about 0.5° C. to about 10° C. per minute, with a particularly effective heating rate, optimizing ceramic yield, of about 0.5° C. per minute. In some applications, flash pyrolysis may be preferred (e.g., in coating applications). In some cases, a dwell period at an intermediate temperature is necessary to enhance curing, reducing volatilization of Si-based fragments, removing organics and eliminating rapid gasification of volatile by-products.

Pyrolysis is carried out at a temperature of at least about 500° C., preferably at temperatures in the range of about 500° C. to about 900° C. In some cases, it may be desirable either to initially pyrolyze at a higher temperature, e.g., 1200° C. or higher, or to carry out an additional high temperature pyrolysis step (again, at greater than about 1200° C.) after the initial, 500° C.–900° C., pyrolysis. Such a procedure is useful to remove residual carbon, and in carbonizing or crystallizing the product. Where mixtures of silicious ceramic products (e.g., silica, silicon oxynitride) and carbon are obtained upon pyrolysis in the 500° C. to 900° C. range, a subsequent high temperature pyrolysis step will give silicon carbide in high yield. Silicon carbide will also be obtained in fairly high yield upon initial high temperature pyrolysis of the carbon-containing ceramic precursors disclosed hereinabove.

After pyrolysis at a relatively low temperature, i.e., in the range of 500° C. to 900° C., a high temperature pyrolysis step may be carried out to convert mixtures of silica or silicon nitride and carbon to silicon carbide or to crystallize an amorphous ceramic product. If desired, pyrolysis may be carried out in the presence of a catalyst; examples of suitable catalysts are set forth in Tables I and II.

Optionally, pyrolysis may be carried out only partially, i.e., in applications where it is not necessary to obtain a fully pyrolyzed material. Such "partial pyrolysis" or partial curing may be carried out at temperatures lower than 500° C.

Although in most cases, it will be desirable to pyrolyze a precursor polymer to form, for example, a ceramic coating, materials prepared by the methods of the invention may also be used as non-ceramic, i.e., non-pyrolyzed coatings and composite matrices.

Silicon nitride coatings find utility in gas turbine engines, on parts that are particularly susceptible to corrosion or oxidation. Also, because silicon nitride and silicon oxide are electrical insulators, the coating process could be used as the dielectric material of capacitors, or for providing insulating coatings in the electronics industry. Other applications are clearly possible.

It is to be understood that while the invention has been described in conjunction with the preferred specific embodiments thereof, that the foregoing description as well as the examples which follow are intended to illustrate and not limit the scope of the invention, which is defined by the scope of the appended claims. Other aspects, advantages and modifications within the scope of the invention will be apparent to those skilled in the art to which the invention pertains.

EXAMPLES

Experimental:

Unless otherwise indicated, the reagents used were obtained from the following sources: silanes from Petrarch Systems, Inc., Bristol, Pa.; organic reagents including amines, from Aldrich Chemical Co., Milwaukee, Wis.; gases, from Matheson, Seacaucus, N.J.; and catalysts, from Strem, Newburyport, Mass.

Example 1

Pyrolysis Studies

An objective of these studies was to evaluate the effect of ammonia environments on pyrolysis. Ammonia is used to promote further crosslinking during the pyrolysis and consequently to increase the ceramic yield. Pyrolysis under ammonia also results in the vaporization of carbon-containing species which appears to be a requirement for achieving the desired silicon nitride product.

Table III illustrates the elemental content of polycyclomethylsilazane (PCMS) pyrolyzed in nitrogen, with and without the addition of ethylene diamine (EDA), and ammonia. The effect of the reduction in carbon on the Si:N ratio can be seen. The addition of EDA did not affect the final ceramic composition. Pyrolysis in ammonia eliminated most of the carbon content.

Figure 1:
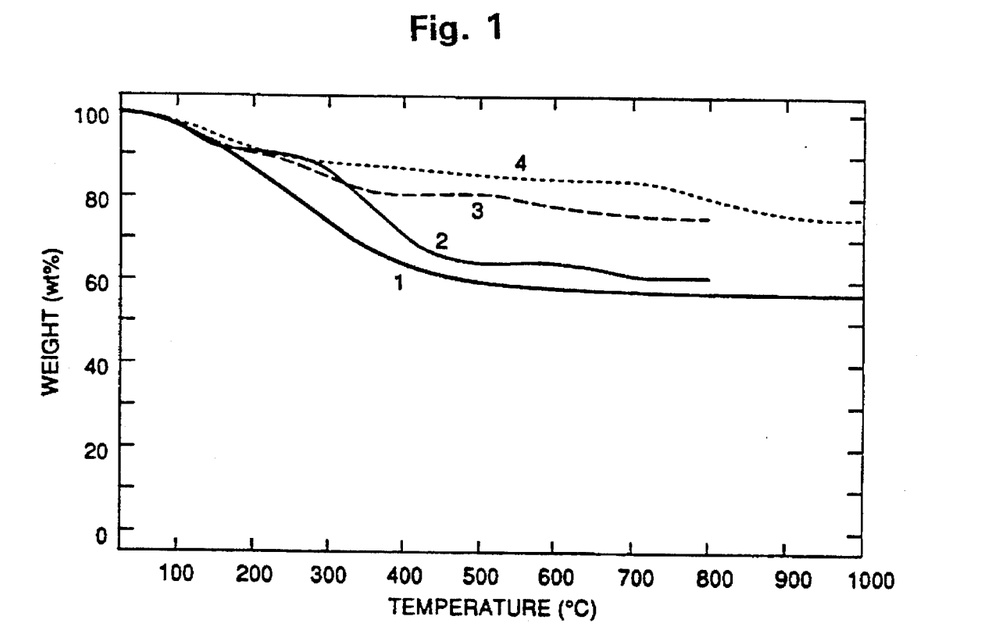
FIG. 1 shows the thermal gravimetric analysis results for low viscosity polycyclomethylsilazane before and after treatment with 5 wt. % ethylene diamine pyrolyzed in N$_2$ or NH$_3$.

The weight change profiles of PCMS and PCMS/10 wt. % EDA pyrolyzed under nitrogen was compared with that observed when pyrolysis was conducted under ammonia. FIG. 1 shows that the EDA crosslinked polymer had a very high ceramic yield with either nitrogen (line 3) or ammonia (line 2), although pyrolysis in nitrogen resulted in a final product with a high carbon content. As shown in Table III, pyrolysis under ammonia resulted in release of this carbon.

TABLE III

Effect of Pyrolysis Atmosphere on Composition of Pyrolyzed Polymer

| Polymer | Atmosphere | Elemental Analysis (mol ratio) | | | |
|---|---|---|---|---|---|
| | | Si | N | C | H |
| PCMS | $N_2$ | 1.00 | 0.99 | 0.73 | 0.45 |
| PCMS | $NH_3$ | 1.00 | 1.34 | <0.02 | 0.37 |
| PCMS/EDA[1] | $N_2$ | 1.0 | 0.93 | 0.75 | 0.41 |

[1]10 wt. % of PCMS

Example 2

Use of Ammonia to Increase Ceramic Yield

Figure 2:
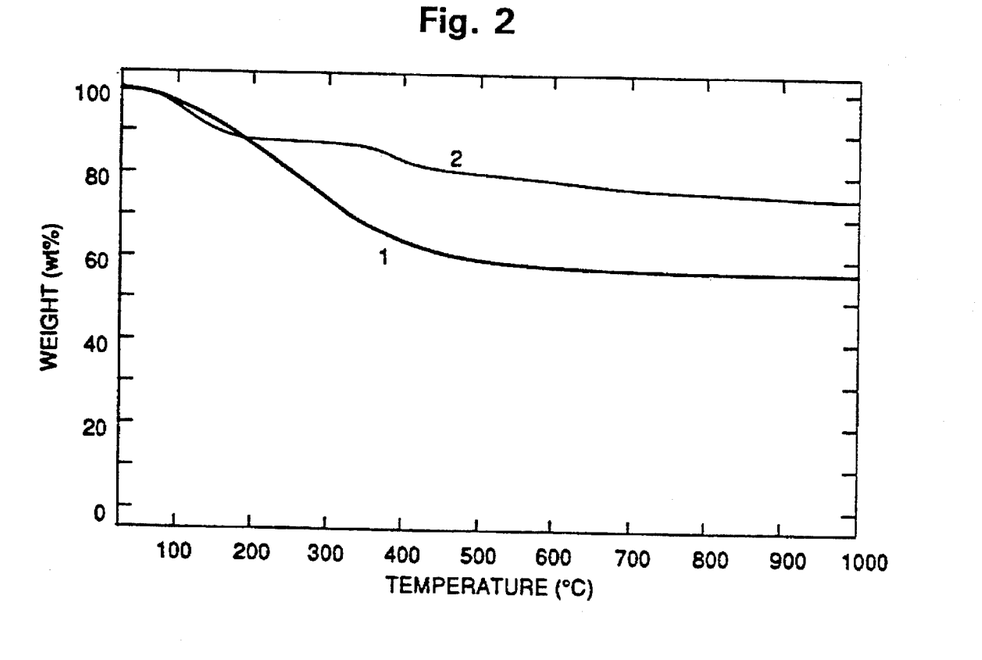
FIG. 2 shows the TGA results for low viscosity PCMS before and after ammonia bubbling into the liquid polymer at 150° C. for 30 minutes.

Ammonia was used as a curing agent to enhance ceramic yield of low viscosity PCMS. The cure rate prior to treatment with ammonia is very slow and complete gelation is obtained only after 9 hours. After treating the PCMS with ammonia, by bubbling ammonia gas into the liquid polymer at 150° C. for 30 min, the ceramic yield was increased from 58 wt. % to 85 wt. % as shown in FIG. 2, even though the polymer viscosity remained low and unchanged.

Example 3

Effect of an Intervening Dwell Time on Ceramic Yield

Figure 3:
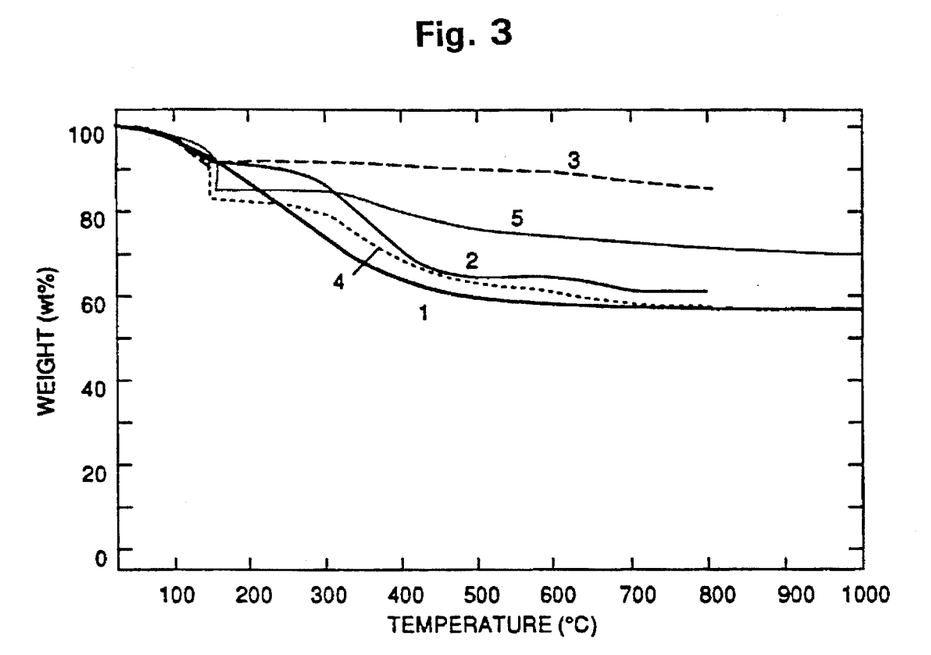
FIG. 3 shows the TGA results of incorporating a dwell period at 150° C. during the pyrolysis.

This experiment was designed to determine the effect of a pyrolysis heating schedule containing a intermediate period at which the temperature is held constant. Because ammonia was considered to have the potential for crosslinking because of its multiple N—H bonds that can undergo rapid dehydrocoupling with polymers that contain Si—H bonds, it was surprising that a standard heating rate of 5° C./min did not result in increased ceramic yield when PCMS was pyrolyzed under ammonia. This contradicted findings that treating the low viscosity polymer with ammonia at 150° C. in a solution significantly increased the ceramic yield (see FIG. 2). A dwell period was incorporated into the heating schedule as follows: (a) heating at a rate of 5° C./min up to 150°; (b) a dwell period at 150° C. for 4 hours; and (c) heating at a rate of 5° C./min up to 1000° C. As shown in FIG. 3, the hold period at 150° C. in ammonia had a significant effect on the pyrolysis yield and that ammonia curing was efficient with this temperature/time combination (compare lines 2 and 3). There was also an improvement in yield (although smaller) when the polymer was held under nitrogen at 150° C. (compare lines 1 and 4, and lines 2 and 5).

Example 4

Use of Reactive Solvent to Increase Ceramic Yield

Figure 4:
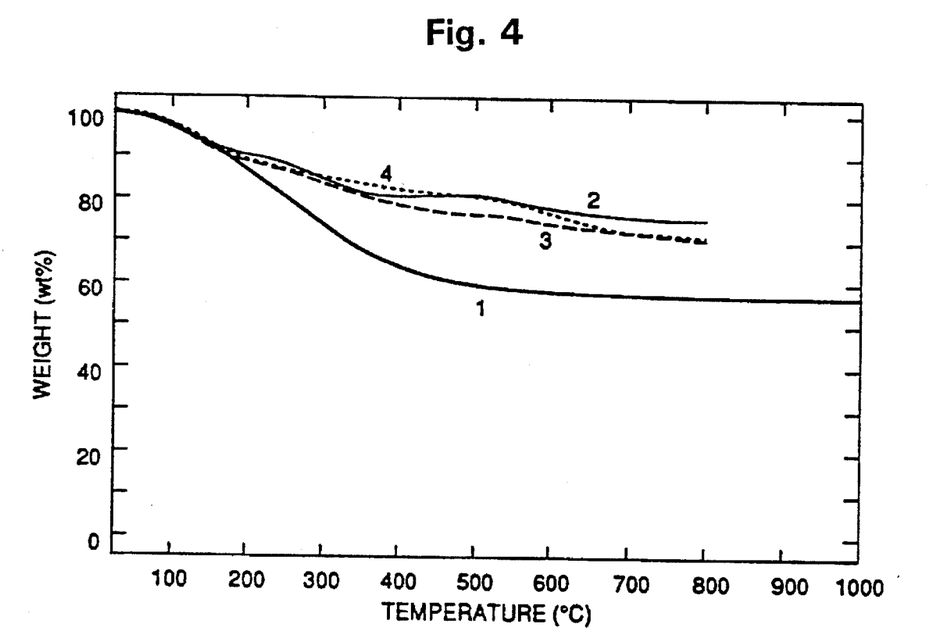
FIG. 4 shows the TGA results for low viscosity PCMS before and after treatment with different quantities of EDA.

Ethylene diamine (EDA) was used as a reactive solvent in order to enhance the rate of increase in viscosity and to increase ceramic yield. A series of reactions were carried out between PCMS and various amounts of EDA at 150° C. in a nitrogen atmosphere to determine the curing rate and the effect of crosslinking on the post-pyrolysis ceramic yield. As shown in Table IV, addition of an optimal amount of EDA (approximately 10 wt. %) accelerated the rate of gelation by a factor of about 20. This indicates that the PCMS/EDA solution changed its viscosity from about 1 poise to over 10,000 poise (a typical gelling stage) in a period of about 8 minutes. Furthermore, the ceramic yields were significantly increased from about 60 to 80 wt. %. As shown in FIG. 4, only a very small amount of EDA (5 wt. %) was required to obtain very high ceramic yields (compare lines 1 and 2).

TABLE IV

Effect of Ethylene Diamine (EDA) on Gelation Time and Ceramic Yield

| Amount of EDA (wt % of PCMS) | Gelation Time (min) | Ceramic Yield (wt %) |
|---|---|---|
| 0 | 1560 | 60 |
| 0[a] | 540 | 85[b] |
| 5 | 28 | 82 |
| 10 | 8 | 78 |
| 20 | 11 | — |

[a]Curing performed in bubbling ammonia
[b]Sample for TGA (thermal gravimetric analysis) was taken after ammonia bubbling for only 30 min. The polymer at this stage still had a very low viscosity.

Example 5

Effect of Catalytic Dehydrocoupling on the Rate of Polymer Formation and Ceramic Yield The objective of this experiment to determine the effect of catalytic dehydrocoupling on the rate of polymer formation and ceramic yield of new types of polymers. Equimolar amounts of cyclomethylsilazane (CMS) (3 g) and ethylene diamine (EDA) (0.65 g) were allowed to react at 60° C. under nitrogen in the absence of a catalyst. After 3.5 hr, the product displayed low viscosity. NMR analysis at that time showed that approximately half of the EDA sites were consumed. After 16 hr, almost all of the EDA sites had been consumed and the polymer became viscous. Toluene was added to the reaction mix and the reaction was allowed to proceed for an additional 6 hr at 90° C. After solvent removal, a polymer was recovered. NMR analysis revealed that all EDA sites had been consumed, i.e., the polymerization reaction progressed through transamination in which the cyclic Si—NH—Si units were replaced with Si—N ($CH_2CH_2N$)—Si units. The polymer was pyrolyzed and the ceramic yield was 75 wt. %. The NMR analysis revealed that the polymeric structure comprised cyclomers bonded through diamine bridging units, having the approximate formula $[CH_3SiHNH]_{0.6}[CH_3SiHNCH_2CH_2N—]_4$.

Example 6

The same reaction as described in Example 5 was carried out in the presence of catalyst. EDA (1.39 gm) was added to powdered $Ru_3(CO)_{12}$ (3 mg) to dissolve the catalyst. An amount of CMS (6 g) equimolar with EDA was added and the reaction allowed to proceed at 90° C. under nitrogen for 45 min, after which the polymer had gelled. The calculated cycles per hour was 43,700 and the total calculated cycles was 32,700 per mole of monomeric Ru. NMR analysis after 20 and 40 min showed that only 0.43 mol of the free amine was consumed.

In the presence of the catalyst, the major polymerization reactivity involved dehydrocoupling, although some transamination, as occurred in Example 5, was noted.

Example 7

Dehydrocoupling Crosslinking After Fabrication and Nitrogen Content in Polysilanes and Polycarbosilanes Five grams of NCP200, a commercially available polysilazane produced by Chisso Corporation and consisting of a $[CH_3SiHNH]_n[CH_3SiN]_n$ backbone, were dissolved in approximately 10 ml tetrahydrofuran and $Ru_3(CO)_{12}$. (NCP200 provides a ceramic yield upon pyrolysis of about 45 wt. % when pyrolyzed in ammonia and 60 wt. % when pyrolyzed in $N_2$). The reaction mix was stirred overnight at 60° C. Thereafter, the solvent was removed from the solution in vacuo. Thermal gravimetric analysis (TGA) of the product after pyrolysis under $N_2$ or $NH_3$ revealed ceramic yields of about 85 wt. % and about 75 wt. % respectively, versus 60 wt. % and 45 wt. % in the absence of catalyst.

Example 8

The same reaction as described in Example 7 was carried out by reacting commercial polycarbosilane (PCS) produced by Nippon Carbon (6 g) in the presence of $Ru_3(CO)_{12}$ (3 mg) in 5 ml tetrahydrofuran. The solution was heated at 100° C. for 3 hr after which the solvent was removed by evaporation. TGA analysis of the product after pyrolysis under $N_2$ or $NH_3$ revealed a ceramic yield of over 85 wt. %, compared with a ceramic yield of the PCS starting material of only 60 wt. %. NMR analysis revealed new C—H bonding. When pyrolyzed under $N_2$, the polymer melted prior to conversion to a ceramic material. When heat-treated in ammonia at 150° C. for 2 hr and 250° C. for 4 hr, the polymer became infusible.

Thus, the product polymer was still meltable when in inert atmosphere under the same conditions. The treatment with ammonia resulted in curing via dehydrocoupling at the solid phase and the polymer was no longer meltable. This is an advantageous curing process since conventional curing involves the undesirable incorporation of oxygen.

Similar treatment for PCS without catalyst does not result in curing prior to melting and the ceramic yield is not increased.

Example 9

Dehydrocoupling Reaction of HMSO with Hexene

Polyhydridomethylsilazane (PHMSO, [MeHSiO]$_x$) is a linear polymer with a molecular weight of about 2000, thus containing about 33 Si—H units, and a viscosity of about 30 cS. Two grams of [MeHSiO]$_x$, equaling about 33 mmol Si—H, was mixed with 4.15 ml 1-hexene (33 mmol) and Ru$_3$(CO)$_{12}$ (1 mg) at room temperature. The reaction, which yielded the hydrosilylated product, was allowed to proceed overnight at room temperature at which time NMR analysis showed the reaction to be about 50% complete. The temperature was raised to 60° C. and held for two hours, at which time the reaction was nearly completed. (Over 90% of the Si—H bonds were consumed).

Example 10

The procedure of Example 9 was repeated with an equimolar amount of n-butanol so as to yield the dehydrocoupled product in which Si—O—C$_4$H$_9$ replaced Si—H bonds.

Example 11

The procedure of Example 9 was repeated using 5 gm HMSO (80 mmoles Si—H), 1.7 ml methanol (40 mmol), and 2 mg Ru$_3$(CO)$_{12}$. (Initially the reaction mixture was heterogeneous, as the polymer does not dissolve in methanol). Gas evolution was observed immediately after the reactants were combined. The reaction was allowed to stir overnight at room temperature at which time NMR showed that the reaction was about 20% complete. The reaction mix was heated to 70° C. and maintained at that temperature for 2 hr. NMR analysis showed that the reaction was complete. The product is soluble in warm methanol but insoluble in water or any water/methanol mixture. Stirring the product in air caused it to gel.

Example 12

The procedure of Example 9 was repeated using 5 gm PHMSO, 9 gm C$_3$F$_4$CH$_2$OH and 2 mg Ru$_3$(CO)$_{12}$ at 80° C., so as to yield the dehydrocoupled product in which Si—O—CH$_2$C$_3$F$_7$ replaced Si—H. This polymer, when applied as a coating on glass slides and heated to 200° C., displays excellent water and organic solvent repellency to 200° C. Water repellency was maintained even at 300° C.

Example 13

The procedure of Example 9 was repeated at 70° C. using 5 gm PHMSO, 3.8 g phenol (40 mmol) and 2 mg Ru$_3$(CO)$_{12}$, so as to yield the dehydrocoupling product in which Si—O—C$_6$H$_5$ replaced Si—H.

Example 14

The procedure of Example 9 was repeated using 5 gm PHMSO, 0.58 ml 1,2-propanediol (8 mmol) and 2 mg Ru$_3$(CO)$_{12}$ at room temperature, so as to yield the dehydrocoupling product in which Si—O—CH$_2$CH(O—)CH$_3$ replaced Si—H and caused rapid curing of the polymer after 2 hours at room temperature.

Example 15

The procedure of Example 9 was repeated using 5 gm HMSO, 0.25 ml ethylene glycol and 2 mg Ru$_3$(CO)$_{12}$ at room temperature, so as to yield the dehydrocoupling product in which Si—O—CH$_2$CH$_2$O— replaced Si—H and caused rapid curing of the polymer after 2 hours at room temperature.

Example 16

The procedure of Example 9 was repeated using 5 gm PHMSO, 5 ml 2-aminoethanol (80 mmol), and 2 mg Ru$_3$(CO)$_{12}$ at room temperature, so as to yield the dehydrocoupling product in which [SiOCH$_2$CH$_2$NH—] replaced Si—H and caused rapid curing of the polymer, within 30 minutes at room temperature.

Example 17

The procedure of Example 9 was repeated using 5 gm PHMSO, 8 ml 2-dimethylaminoethanol (80 mmol), and 2 mg Ru$_3$(CO)$_{12}$ at room temperature, so as to yield the dehydrocoupling product in which Si—O—CH$_2$CH$_2$NMe$_2$ replaced Si—H. The reaction was very rapid at room temperature and was complete within 2 hours. The polymeric product was found to be soluble in acidic water but then precipitated within 1–2 hours. The polymeric product can be reacted with dry HCl gas in a solvent such as toluene or diethylether or the like to precipitate a white solid. This solid has been found to be soluble in water and NMR experiments have demonstrated that this is the HCl salt of the polymeric product.

Example 18

The procedure of Example 9 was repeated using 5 gm PHMSO, 2.41 g of allyl alcohol (42 m mole), and 2 mg Ru$_3$(CO)$_{12}$ at room temperature, so as to yield the dehydrocoupling product in which Si—O—CH$_2$CHCH replaced Si—H. The reaction proceeded vigorously when the reactants were mixed. In five hours the product cured at room temperature and formed a colorless product. The NMR analysis of the soluble portion of the product indicated that both dehydrocoupling and hydrosilation had occurred.

The same procedure was repeated with chloroplatinic acid as catalyst. Similar hydrosilation and dehydrocoupling were observed as indicated by NMR analysis.

I claim:

1. A method for preparing a preceramic silicon-containing polymer having functional groups covalently bound thereto, comprising:

(a) conducting a dehydrocoupling reaction between (i) a polymeric starting material containing at least two Si—H groups and selected from the group consisting of polysilanes, polysilazanes, polysiloxanes and polycarbosilanes, and (ii) a reactant R—O—H or R—N(R')—H wherein R is H, hydrocarbyl, halocarbyl, ether-containing hydrocarbyl, acyl, silyl, siloxyl, silazanyl or carbosilyl, and may contain at least one additional O—H group, and R' is H, hydrocarbyl, halocarbyl, ether-containing hydrocarbyl, acyl, amino, silyl or silazanyl, wherein the reaction is carried out in the presence of a transition metal catalyst effective to activate Si—H bonds, O—H bonds, or both, such that a modified polymer is produced containing at least one Si—O bond and at least one Si—H bond, and $H_2$ is released;

(b) optionally conducting a hydrosilylation reaction between (i) the polymeric starting material or the modified polymer, and (ii) an unsaturated organic compound, by contacting either the polymeric starting material or the modified polymer or both with the unsaturated organic compound under hydrosilylation conditions to provide a hydrosilylated polymer; and (c) optionally curing the polymeric starting material, the modified polymer, and/or the hydrosilylated polymer, with a curing agent, with the proviso that if the polymeric starting material is a polysilazane or a polysiloxane, both steps (a) and (b) are always carried out.

2. The method of claim 1, wherein the polymeric starting material is a polysilane.

3. The method of claim 1, wherein the polymeric starting material is a polysilazane.

4. The method of claim 1, wherein the polymeric starting material is a polysiloxane.

5. The method of claim 1, wherein the polymeric starting material is a polycarbosilane.

6. The method of claim 1, wherein the reactant is R—O—H.

7. The method of claim 6, wherein R is hydrogen.

8. The method of claim 6, wherein the reaction of step (b) is carried out.

9. The method of claim 6, wherein the reaction step of step (c) is carried out.

10. The method of claim 6, wherein the reactions of both step (b) and step (c) are carried out.

11. The method of claim 9, wherein the curing agent has the structural formula H—Z—H, wherein Z is selected from the group consisting of oxygen, sulfur, phosphoro, amino, —O—Y—O—, —NX—NX—, and —NX—Y—NX—, where Y is lower alkyl or silyl, and X is lower alkyl, silyl or hydrogen.

12. The method of claim 1, wherein the reactant is R—N(R')—H.

13. The method of claim 12, wherein the reaction includes step (c).

14. The method of claim 13, wherein the curing agent has the structural formula H—Z—H, wherein Z is selected from the group consisting of oxygen, sulfur, phosphoro, amino, —O—Y—O—, —NX—NX—, and —NX—Y—NX—, where Y is lower alkyl or silyl, and X is lower alkyl, silyl or hydrogen.

15. The method of claim 1, wherein the reactant serves as a solvent for the polymer.

16. The method of claim 1, wherein the reaction is carried out in the presence of an added solvent which also reacts with the polymer.

17. The method of claim 16, wherein the added solvent is an amine, a diamine, a monohydric alcohol, or a diol.

18. A polymer produced by the process of claim 1.

19. A polymer produced by the process of claim 6.

20. A polymer produced by the process of claim 12.

* * * * *